3,036,013
COATED CALCIUM HYPOCHLORITE AND PROCESS FOR MAKING SAME

Daniel J. Jaszka and Ronald W. Marek, Tonawanda, N.Y., assignors to Olin Mathieson Chemical Corporation, a corporation of Virginia
No Drawing. Filed Feb. 16, 1959, Ser. No. 793,277
10 Claims. (Cl. 252—99)

This invention relates to the treatment of granular high test calcium hypochlorite having at least about 65 percent of available chlorine to form an adherent coating of a stable substantially insoluble calcium salt thereon. The properties of the coated calcium hypochlorite, particularly with respect to stability, are improved and the product is of improved utility in bleaching and laundering.

High test calcium hypochlorite, usually containing 70 percent or more of available chlorine, is marketed in granular form for use in bleaching, disinfecting and in laundering operations. A particular, widely distributed product of this type is marketed under the trademark "HTH" by Olin Mathieson Chemical Corporation, Niagara Falls, New York. When the granules are introduced into a laundering step for the purpose of bleaching cotton textiles, it is sometimes possible for the granules to lodge in contact with the cloth. Dissolving slowly, the granules produce a concentrated solution of high available chlorine content in contact with the cloth resulting in holes which damage the cloth. The damage may appear as large holes immediately on rinsing but more commonly the concentration and time of contact is sufficient only to weaken the fiber. On subsequent ironing and washing in repeated cycles small holes may develop and the difficulty is known as pinholing.

According to the process of this invention, the high test calcium hypochlorite granules are treated with a solution of a soluble salt which reacts with calcium hypochlorite on the surface of the granules and coats them with an insoluble calcium salt. This increases the stability with respect to storage in a humid atmosphere and the granule dissolves more slowly, the coating thus preventing the formation of pinholes in cotton textiles treated therewith.

Sodium silicate is the preferred soluble salt which provides an insoluble calcium silicate coating on the calcium hypochlorite granule. Sodium silicate is cheap, readily available and most effective since the resulting coating is tightly adherent, stabilizes the calcium hypochlorite with respect to loss of available chlorine on storage and prevents pinholing.

Other soluble alkali metal salts which are suitable are those which are soluble in water to at least about 5 percent at room temperature and have anions which do not react with calcium hypochlorite except to form the calcium salt. Suitable soluble neutral to alkaline alkali metal salts include borax, sodium metaborate, sodium carbonate, trisodium phosphate, disodium phosphate and potassium fluoride. Other corresponding potassium salts are suitable.

The sodium silicate solution used for the treatment of calcium hypochlorite granules according to this invention is neutral or alkaline and has a concentration of from about 5 to 50 percent $Na_2SiO_3$ but preferably from about 15 to 25 percent. Using solutions in the preferred range of concentration, the time of contact with the calcium hypochlorite granules should be about 0.1 to 1 minute at room temperature. The time should be increased for more dilute solutions and decreased for more concentrated solutions. It should be increased at lower temperatures and decreased at higher temperatures. The treating solution may be applied by spraying or any other suitable means but immersion is ordinarily most convenient. Under these conditions the calcium hypochlorite granules are coated only on the surface and the product has the desired improved properties including enhanced stability and inability to cause pinholing in normal use. Products prepared under the preferred conditions are composed of about 80 to 95 percent of a core of calcium hypochlorite with a coating of calcium silicate amounting to about 5 to 20 percent.

In the treatment of calcium hypochlorite granules with sodium silicate solution, a reaction occurs in which the calcium is converted to calcium silicate forming sodium hypochlorite as a by-product. Most of the relatively unstable sodium hypochlorite is removed with the liquor since it is very soluble in water and any residual sodium hypochlorite is largely decomposed in drying. The resulting coated granules, consisting largely of calcium hypochlorite with a coating of calcium silicate, have enhanced stability and freedom from pinholing.

Mixtures of calcium hypochlorite have previously been prepared for various purposes with alkaline and neutral salts where every effort has been exerted to effect thorough mixing of the components in dry, particulate form. This prior art is contrary to the teaching of the present invention. According to the present invention, calcium hypochlorite granules are treated in a wet way to form on each calcium hypochlorite particle by chemical reaction a protective layer which is non-reactive with calcium hypochlorite, strongly adherent and which retards solution of the calcium hypochlorite, thus avoiding locally high concentrations of available chlorine.

Example I

Forty grams of "HTH" brand of granular high test calcium hypochlorite containing about 70 percent available chlorine and having substantially all of the granules between 30 and 70 mesh (U.S. standard screens) were placed in a Buchner funnel without filter paper. The hypochlorite was covered with about 27 grams of an 18 percent aqueous sodium silicate solution which was immediately drawn off by suction. The hypochlorite was covered with a second equal portion of the sodium silicate solution which was immediately removed by suction. The hypochlorite was treated a third time in the same way. After removing as much of the liquid as possible by suction, 67 grams of wet product was obtained. After vacuum drying, the resulting granular product weighed 43 grams and contained 67.2 percent available chlorine. From the available chlorine analysis, the product was calculated to consist of about 93 percent of calcium hypochlorite coated with about 7 percent of calcium silicate.

A portion of the coated granules was stored at room temperature (23° C.) in a glass stoppered bottle for 30 days. The available chlorine content at the end of this period was 62.3 percent. The loss in available chlorine was about 0.13 percent per day which is sufficiently low to be satisfactory in commercial use.

About 2 grams to 5 grams of the product was placed in an open petri dish and stored in a humidity oven at 100 percent relative humidity and 80° F. for about 16 hours. At the start of the humidity test, the sample contained about 64 percent available chlorine. At the end of the test the product was still granular and the available chlorine content indicated that the loss of available chlorine was 2.06 percent per hour. Untreated calcium hypochlorite granular containing initially 70 percent available chlorine and stored under the same conditions became liquid before the end of the test and the loss of available chlorine was calculated to be 3.06 percent per hour. The stability of the product of this invention under the humid conditions of this accelerated test is thus much improved over that of untreated hypochlorite granules.

In a less severe humidity test the relative humidity was maintained at 50 percent and the temperature at 75° F. for 16 hours. At the end of the test the coated granules showed a loss of available chlorine of 0.384 percent per hour compared with about 1.03 percent per hour for untreated calcium hypochlorite granules stored under the same conditions. In this less severe test the coated composition thus shows a considerably increased stability.

A pinholing test was carried out by placing a 3 to 5 gram sample of the product in the center of a wet square of cotton sheeting, wrapped into a ball and allowed to stand for five minutes. The cloth was rinsed after five minutes and the cloth was found to be undamaged. When this test was repeated with uncoated granules of calcium hypochlorite containing 70 percent available chlorine a hole approximately one inch in diameter was formed in the cloth. When this test was repeated with a dry mixture of about 5 percent of crystalline anhydrous sodium silicate and 95 percent of granular high test calcium hypochlorite, the mixture containing about 67 percent of available chlorine, pinholing occurred to the same extent as with granular high test hypochlorite alone.

A bleaching test was carried out using pure Indian Head cotton cloth, tea stained in accordance with the following procedure. Square cloths, 12″ x 12″, were steeped at 65° C. in a liter of solution containing 13 grams of Salada tea. The cloths were wrung out, air dried for 1 to 2 hours and ironed. The reflectance of each cloth was determined using a Photovolt photometer. The bleaching operations were performed in a U.S. Testing Company Terg-o-tometer at a constant temperature of 150° F. Exactly ten grams of stained cloth were bleached with 500 cc. of a solution containing 1000 p.p.m. (parts per million) of Tide, a built alkyl aryl sulfonate detergent, 600 p.p.m. of Drymet (sodium silicate) buffer and enough bleach to yield 200 p.p.m. of available chlorine in the solution. After washing for 8 minutes, the cloths were rinsed three times, dried and ironed. The reflectance of the bleached cloths was determined in the same way as before to measure the effectiveness of the bleach. Using either untreated "HTH" or the "HTH" treated as described above in this example, the bleaching cloths having an initial reflectance of 58 were bleached to a reflectance of 85. These tests show that the treated "HTH" of this invention bleaches as effectively as the untreated "HTH."

*Example II*

A saturated solution of borax made up from about 20 grams of $Na_2B_4O_7.10H_2O$ and 40 grams of water was poured over 40 grams of granular high test calcium hypochlorite contained in a Buchner funnel. The solution was immediately removed by suction and the residue was vacuum dried to a powder containing 58.3 percent available chlorine. From the available chlorine content, the approximate composition of the granule appears to be about 80 percent calcium hypochlorite covered with a coating of about 20 percent of calcium borate.

When tested as described in the preceding example, the product caused no pinholing or damage to the cotton fabric.

When stored at room temperature in a glass stoppered bottle for 70 days, the available chlorine dropped from an initial 66.2 percent to a final 47.3 percent, a loss of 0.27 percent per day. This is sufficiently low to be satisfactory for commercial use.

In a bleaching test of tea stained cotton cloth as described in Example I, reflectances were raised from 57 to 84 using the product of this example compared with a bleach from 58 to 85 using untreated "HTH." The bleaching effectiveness of the calcium hypochloriate was thus not significantly affected by the treatment.

*Example III*

One hundred grams of granular "HTH" was placed in a Buchner funnel without filter paper. The hypochlorite was covered with 82 grams of an 18 percent aqueous sodium silicate solution at 23° C. and the solution was immediately drawn off by suction. This treatment was repeated twice, obtaining 126 grams of wet product which was vacuum dried to a coated product containing 66.2 percent of available chlorine.

On storage at room temperature in a glass stoppered bottle for 74 days, the available chlorine dropped to 57.5 percent, a loss of 0.115 percent per day which is within commercially satisfactory limits.

In the 50 percent humidity test described in Example I, the product of this example showed a loss of 0.364 percent per hour compared with about 1.03 percent per hour for untreated "HTH."

No pinholing occurred when the test described in Example I above was applied to the composition of this example.

The product of this example was used as a bleach in the test described in Example I. It gave a reflectance of 86 compared with 85 using untreated "HTH" showing that the treated granules retained the excellent bleaching power of the original "HTH."

What is claimed is:

1. A process of treating granular high test calcium hypochlorite which comprises wetting the surface of the granules with a neutral to alkaline aqueous solution containing between about 5 and 50 percent of a soluble alkali metal salt of an anion selected from the group consisting of borate, carbonate, silicate, phosphate and fluoride, maintaining the granules in contact with the solution until aoubt 5 to 20 percent of the calcium hypochlorite is converted to insoluble calcium salt, removing the granules from the excess solution and drying the granules.

2. A process according to claim 1 in which the alkali metal salt is sodium silicate.

3. A process according to claim 1 in which the alkali metal salt is sodium carbonate.

4. A process according to claim 1 in which the sodium salt is borax.

5. A process according to claim 1 in which the granular calcium hypochlorite is bteween about 30 and 70 mesh U.S. standard screens.

6. A dry granular high test calcium hypochlorite product in which each granule consists of about 80 to 95 percent of a core of high test calcium hypochlorite with 20 to 5 percent of a strongly adherent coating of an insoluble calcium salt of an anion selected from the group consisting of borate, carbonate, silicate, phosphate and fluoride.

7. The product of claim 6 in which the coating is calcium silicate.

8. The product of claim 6 in which the coating is calcium carbonate.

9. The product of claim 6 in which the coating is calcium borate.

10. The product of claim 6 in which the granular calcium hypochlorite is between about 30 and 70 mesh U.S. standard screens.

References Cited in the file of this patent

UNITED STATES PATENTS

| | | |
|---|---|---|
| 1,894,207 | Taylor | Jan. 10, 1933 |
| 2,020,228 | Ashton | Nov. 5, 1935 |
| 2,222,830 | Moss | Nov. 26, 1940 |
| 2,753,241 | MacMahon | July 3, 1956 |
| 2,874,123 | Schaafsma | Feb. 17, 1959 |

FOREIGN PATENTS

| | | |
|---|---|---|
| 606,431 | Great Britain | Aug. 13, 1948 |